(12) United States Patent
Gilson et al.

(10) Patent No.: US 11,277,163 B2
(45) Date of Patent: *Mar. 15, 2022

(54) RADIO FREQUENCY WAVEGUIDE COMMUNICATION IN HIGH TEMPERATURE ENVIRONMENTS

(71) Applicant: Raytheon Technologies Corporation, Farmington, CT (US)

(72) Inventors: Jonathan Gilson, West Hartford, CT (US); Joseph V. Mantese, Ellington, CT (US); Goran Djuknic, New York, NY (US); Gurkan Gok, Milford, CT (US); Brenda J. Lisitano, Middletown, CT (US); Coy Bruce Wood, Ellington, CT (US); Sanjay Bajekal, Simsbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/086,588

(22) Filed: Nov. 2, 2020

(65) Prior Publication Data

US 2021/0159930 A1 May 27, 2021

Related U.S. Application Data

(63) Continuation of application No. 16/692,125, filed on Nov. 22, 2019, now Pat. No. 10,826,547.

(51) Int. Cl.
*H04L 5/16* (2006.01)
*H04B 1/38* (2015.01)
(Continued)

(52) U.S. Cl.
CPC ................. *H04B 1/38* (2013.01); *F02C 9/00* (2013.01); *G05B 15/02* (2013.01); *H01P 3/12* (2013.01);
(Continued)

(58) Field of Classification Search
CPC ................. H04L 25/0266; H04L 7/023; H04L 12/40045; H04L 41/0803; H04L 67/12;
(Continued)

(56) References Cited

U.S. PATENT DOCUMENTS

| 5,267,436 A | 12/1993 | Wood, Jr. et al. |
| 7,455,495 B2 | 11/2008 | Leogrande et al. |

(Continued)

FOREIGN PATENT DOCUMENTS

EP 3291570 A1 3/2018

OTHER PUBLICATIONS

EP Application No. 20205026.6 Extended EP Search Report dated Mar. 24, 2021, 9 pages.

(Continued)

*Primary Examiner* — Khai Tran
(74) *Attorney, Agent, or Firm* — Cantor Colburn LLP

(57) ABSTRACT

A system of a machine includes a network of nodes distributed throughout the machine. A means is operable to communicate with the network of nodes through one or more electromagnetic signals. A plurality of waveguides is configured to guide transmission of the one or more electromagnetic signals. A radio frequency antenna is coupled to a first waveguide of the plurality of waveguides. A radio frequency transceiver is coupled between the means and the radio frequency antenna. A membrane is configured to support communication between the first waveguide and at least one node of the plurality of nodes.

20 Claims, 5 Drawing Sheets

(51) Int. Cl.
*H04L 67/12* (2022.01)
*G05B 15/02* (2006.01)
*F02C 9/00* (2006.01)
*H01P 3/12* (2006.01)

(52) U.S. Cl.
CPC .......... *H04L 67/12* (2013.01); *F05D 2220/32* (2013.01); *F05D 2270/80* (2013.01)

(58) Field of Classification Search
CPC ........ H04B 15/02; H04B 15/025; H04B 3/52; F01D 28/003; F01D 21/023; F04D 17/02; H01D 25/14; H04Q 1/116; H01P 3/12; F02K 3/068; H01Q 5/55
USPC .......................................... 375/220; 415/118
See application file for complete search history.

(56) References Cited

U.S. PATENT DOCUMENTS

| | | |
|---|---|---|
| 7,464,585 B2 | 12/2008 | Schwarz et al. |
| 7,570,169 B2 | 8/2009 | Li et al. |
| 7,769,507 B2 | 8/2010 | Volponi et al. |
| 7,844,385 B2 | 11/2010 | Loda et al. |
| 7,927,067 B2 | 4/2011 | Rajamani et al. |
| 8,026,857 B2 | 9/2011 | Bommer |
| 8,074,498 B2 | 12/2011 | Agrawal et al. |
| 8,085,108 B2 | 12/2011 | Philippe |
| 8,204,671 B2 | 6/2012 | Agrawal et al. |
| 8,256,277 B2 | 9/2012 | Khilbnik et al. |
| 8,424,279 B2 | 4/2013 | Rajamani et al. |
| 8,459,103 B2 | 6/2013 | Khilbnik et al. |
| 8,570,152 B2 | 10/2013 | Fahley et al. |
| 8,733,149 B2 | 5/2014 | Yu et al. |
| 8,754,320 B2 | 6/2014 | Mantese |
| 8,800,261 B2 | 8/2014 | Hall et al. |
| 8,820,088 B2 | 9/2014 | Gilson et al. |
| 8,973,364 B2 | 3/2015 | Gilson et al. |
| 8,997,497 B2 | 4/2015 | Hall et al. |
| 9,051,897 B2 | 6/2015 | Schwarz et al. |
| 9,599,637 B2 | 3/2017 | Mantese et al. |
| 9,745,918 B2 | 8/2017 | Gilson et al. |
| 9,920,653 B2 | 3/2018 | Lord et al. |
| 9,932,933 B2 | 4/2018 | Lord et al. |
| 9,986,310 B2 | 5/2018 | Sobanski et al. |
| 9,990,576 B2 | 6/2018 | Nardi et al. |
| 10,051,345 B2 | 8/2018 | Mantese et al. |
| 10,057,663 B2 | 8/2018 | Sobanski et al. |
| 10,066,548 B2 | 9/2018 | Gilson et al. |
| 10,080,068 B2 | 9/2018 | Sobanski |
| 10,091,562 B2 | 10/2018 | Mantese et al. |
| 10,107,132 B2 | 10/2018 | Wu et al. |
| 10,107,191 B2 | 10/2018 | Gilson et al. |
| 10,140,566 B2 | 11/2018 | Viikari |
| 10,145,729 B2 | 12/2018 | Viikari et al. |
| 10,184,340 B2 | 1/2019 | Baltas et al. |
| 10,253,417 B2 | 4/2019 | Viens et al. |
| 10,253,984 B2 | 4/2019 | Pearson et al. |
| 10,301,971 B2 | 5/2019 | Lord et al. |
| 10,337,121 B2 | 7/2019 | Mantese et al. |
| 10,362,115 B2 | 7/2019 | Bommer et al. |
| 10,371,051 B2 | 8/2019 | Gilson et al. |
| 10,405,066 B2 | 9/2019 | Sobanski et al. |
| 10,410,814 B2 | 9/2019 | Mantese et al. |
| 10,419,831 B2 | 9/2019 | Mantese et al. |
| 10,461,973 B2 | 10/2019 | Nikunen et al. |
| 10,469,920 B2 | 11/2019 | Zacchio et al. |
| 10,484,760 B2 | 11/2019 | Mantese et al. |
| 10,491,970 B2 | 11/2019 | Sobanski et al. |
| 10,531,166 B2 | 1/2020 | Mantese et al. |
| 10,581,279 B2 | 3/2020 | Mantese et al. |
| 10,589,351 B2 | 3/2020 | Rebbecchi et al. |
| 10,638,207 B2 | 4/2020 | Mantese et al. |
| 10,655,538 B2 | 5/2020 | Gilson et al. |
| 10,711,367 B2 | 7/2020 | Mantese et al. |
| 10,826,547 B1 * | 11/2020 | Gilson .................... H01P 3/12 |
| 2005/0040934 A1 | 2/2005 | Shanton |
| 2007/0119257 A1 | 5/2007 | Hayasaka et al. |
| 2008/0153415 A1 | 6/2008 | Block et al. |
| 2009/0184877 A1 | 7/2009 | Bommer |
| 2010/0129202 A1 | 5/2010 | Garner |
| 2010/0287907 A1 | 11/2010 | Agrawal et al. |
| 2010/0321191 A1 | 12/2010 | Gong et al. |
| 2013/0219922 A1 | 8/2013 | Gilson et al. |
| 2013/0283821 A1 | 10/2013 | Gilson et al. |
| 2014/0113671 A1 | 4/2014 | Schwengler |
| 2014/0144153 A1 | 5/2014 | Healy |
| 2014/0366554 A1 | 12/2014 | Gilson et al. |
| 2016/0040604 A1 | 2/2016 | Hrach et al. |
| 2016/0108854 A1 | 4/2016 | Lord et al. |
| 2016/0169939 A1 | 6/2016 | Tokgoz et al. |
| 2016/0313139 A1 | 10/2016 | Klecka et al. |
| 2016/0319837 A1 | 11/2016 | Morris et al. |
| 2016/0356866 A1 | 12/2016 | Attridge et al. |
| 2016/0370256 A1 * | 12/2016 | Zacchio ................ H01Q 5/55 |
| 2017/0286820 A1 | 10/2017 | Nikunen et al. |
| 2017/0366228 A1 | 12/2017 | Bobrek et al. |
| 2018/0209379 A1 | 7/2018 | Lord et al. |
| 2018/0238574 A1 | 8/2018 | Ky et al. |
| 2018/0289359 A1 | 10/2018 | Heims et al. |
| 2018/0294838 A1 | 10/2018 | Snyder et al. |
| 2018/0360312 A1 | 12/2018 | Gupta et al. |
| 2018/0372563 A1 | 12/2018 | Rogers et al. |
| 2019/0127877 A1 | 5/2019 | Mantese et al. |
| 2019/0345835 A1 | 11/2019 | Terwilliger et al. |
| 2020/0025036 A1 | 1/2020 | Lord et al. |

OTHER PUBLICATIONS

EP Application No. 20205028.2 Extended EP Search Report dated Mar. 25, 2021, 8 pages.
EP Application No. 20205031.6 Extended EP Search Report dated Mar. 24, 2021, 9 pages.
Hotte, et al., "A Concept of Pressure Sensor Based on Slotted Waveguide Antenna Array for Passive MMID Sensor Networks", IEEE Sensors Journal, vol. 16, No. 14, Jul. 15, 2016, 5 pages.
Wenqiang, et al., "A novel physical parameters measuring method using wireless passive sensor in harsh environment", 2015 IEEE 12th International Conference on Electronic Measurement & Instruments, vol. 3, Jul. 16, 2015, pp. 1481-1485.

* cited by examiner

RADIO FREQUENCY WAVEGUIDE COMMUNICATION IN HIGH TEMPERATURE ENVIRONMENTS

CROSS-REFERENCE TO RELATED APPLICATIONS

This application is a continuation of U.S. patent application Ser. No. 16/692,125 filed Nov. 22, 2019, the disclosure of which is incorporated by reference herein in its entirety.

BACKGROUND

This disclosure relates to electromagnetic communication, and more particularly to a radio frequency waveguide communication in high temperature environments.

As control and health monitoring systems become more complex, the interconnect count between system components increases, which also increases failure probabilities. With the increase in interconnects, troubleshooting systems may not always identify the contributing faulty components reliably when system anomalies occur. Failures associated with such systems are often due to connection system failures, including: sensors, wiring, and connectors that provide interconnection (e.g., signal and power) between all components.

Difficulties can arise when troubleshooting these complex interconnected systems, especially when the systems include subsystems having electronic components connected to control system devices, such as actuators, valves or sensors. For example, a noisy signal in a sensor reading could be caused by a faulty interface circuit in the electronic component, a faulty wire or short(s) in the cable system, and/or a faulty or intermittent sensor. The time associated with identifying a faulty component quickly and accurately affects operational reliability.

Detailed knowledge of machinery operation for control or health monitoring requires sensing systems that need information from locations that are sometimes difficult to access due to moving parts, internal operating environment or machine configuration. The access limitations make wire routing bulky, expensive and vulnerable to interconnect failures. The sensor and interconnect operating environments for desired sensor locations often exceed the capability of the interconnect systems. In some cases, cable cost, volume and weight exceed the desired limits for practical applications.

Application of electromagnetic sensor and effector technologies to address the wiring constraints faces the challenge of providing reliable communications in a potentially unknown environment with potential interference from internal or external sources. Large-scale deployments of multiple sensors and/or effectors with varying signal path lengths further increases the challenges of normal operation and fault detection in a network of connected nodes. High temperature environments further constrain communication system components.

BRIEF DESCRIPTION

According to one embodiment, a system of a machine includes a network of nodes distributed throughout the machine. A means is operable to communicate with the network of nodes through one or more electromagnetic signals. A plurality of waveguides is configured to guide transmission of the one or more electromagnetic signals. A radio frequency antenna is coupled to a first waveguide of the plurality of waveguides. A radio frequency transceiver is coupled between the means and the radio frequency antenna. A membrane is configured to support communication between the first waveguide and at least one node of the plurality of nodes.

In addition to one or more of the features described above or below, or as an alternative, further embodiments may include where the first waveguide is a hollow metallic waveguide.

In addition to one or more of the features described above or below, or as an alternative, further embodiments may include where the radio frequency transceiver is configured to output a pulse train to the radio frequency antenna to broadcast within the first waveguide responsive to the means.

In addition to one or more of the features described above or below, or as an alternative, further embodiments may include a dielectric disk in the first waveguide proximate to the membrane, where the dielectric disk is configured to generate a plurality of acoustic pressure waves to mechanically vibrate the membrane responsive to the pulse train broadcast through the first waveguide, and the at least one node includes an effector node.

In addition to one or more of the features described above or below, or as an alternative, further embodiments may include where the at least one node includes an oscillator and a modulator configured to vibrate the membrane based on a sensor response, and the radio frequency transceiver is configured to detect vibration of the membrane.

In addition to one or more of the features described above or below, or as an alternative, further embodiments may include where the radio frequency transceiver is configured to output a pulse train to the radio frequency antenna to broadcast within the first waveguide responsive to the means.

In addition to one or more of the features described above or below, or as an alternative, further embodiments may include a dielectric ring in the first waveguide proximate to the membrane, where the dielectric ring is configured to generate a plurality of acoustic pressure waves to mechanically vibrate the membrane responsive to the pulse train broadcast through the first waveguide, and the at least one node includes an effector and sensor node.

According to an embodiment, a system for a gas turbine engine includes a network of a plurality of nodes distributed throughout the gas turbine engine. Each of the nodes is associated with at least one sensor and/or effector of the gas turbine engine and is operable to communicate through one or more electromagnetic signals. A controller of the gas turbine engine is operable to communicate with the network of nodes through the one or more electromagnetic signals. A plurality of waveguides is configured to guide transmission of the one or more electromagnetic signals between the controller and one or more of the nodes. A radio frequency antenna is coupled to a first waveguide of the plurality of waveguides. A radio frequency transceiver is coupled between the controller and the radio frequency antenna. A membrane is configured to support communication between the first waveguide and at least one node of the plurality of nodes.

In addition to one or more of the features described above or below, or as an alternative, further embodiments may include where one or more of the nodes are located at least one of a fan section, a compressor section, a combustor section and a turbine section of the gas turbine engine, and the first waveguide can be a hollow metallic waveguide.

In addition to one or more of the features described above or below, or as an alternative, further embodiments may include where the radio frequency transceiver is configured to output a pulse train to the radio frequency antenna to broadcast within the first waveguide responsive to the controller.

In addition to one or more of the features described above or below, or as an alternative, further embodiments may include where the radio frequency transceiver is configured to output a pulse train to the radio frequency antenna to broadcast within the first waveguide responsive to the controller, and a dielectric ring in the first waveguide is proximate to the membrane, where the dielectric ring is configured to generate a plurality of acoustic pressure waves to mechanically vibrate the membrane responsive to the pulse train broadcast through the first waveguide, and the at least one node includes an effector and sensor node.

According to an embodiment, a method of establishing electromagnetic communication through a machine includes configuring a network of a plurality of nodes to communicate through a one or more electromagnetic signals, where the nodes are distributed throughout the machine. Communication between a controller and the network of nodes is initiated through the one or more electromagnetic signals. Transmission of the one or more electromagnetic signals is guided in a plurality of waveguides between the controller and one or more of the nodes. A portion of the one or more electromagnetic signals propagate through a radio frequency antenna coupled to a first waveguide of the plurality of waveguides, a radio frequency transceiver is coupled between the controller and the radio frequency antenna, and a membrane is configured to support communication between the first waveguide and at least one node of the plurality of nodes.

In addition to one or more of the features described above or below, or as an alternative, further embodiments may include outputting a pulse train from the radio frequency transceiver to the radio frequency antenna to broadcast within the first waveguide responsive to the controller.

In addition to one or more of the features described above or below, or as an alternative, further embodiments may include where the at least one node comprises an oscillator and a modulator, and the method includes vibrating the membrane based on a sensor response modulated with a carrier frequency of the oscillator by the modulator, and detecting vibration of the membrane by the radio frequency transceiver.

A technical effect of the apparatus, systems and methods is achieved by using radio frequency waveguide communication in high temperature environments as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
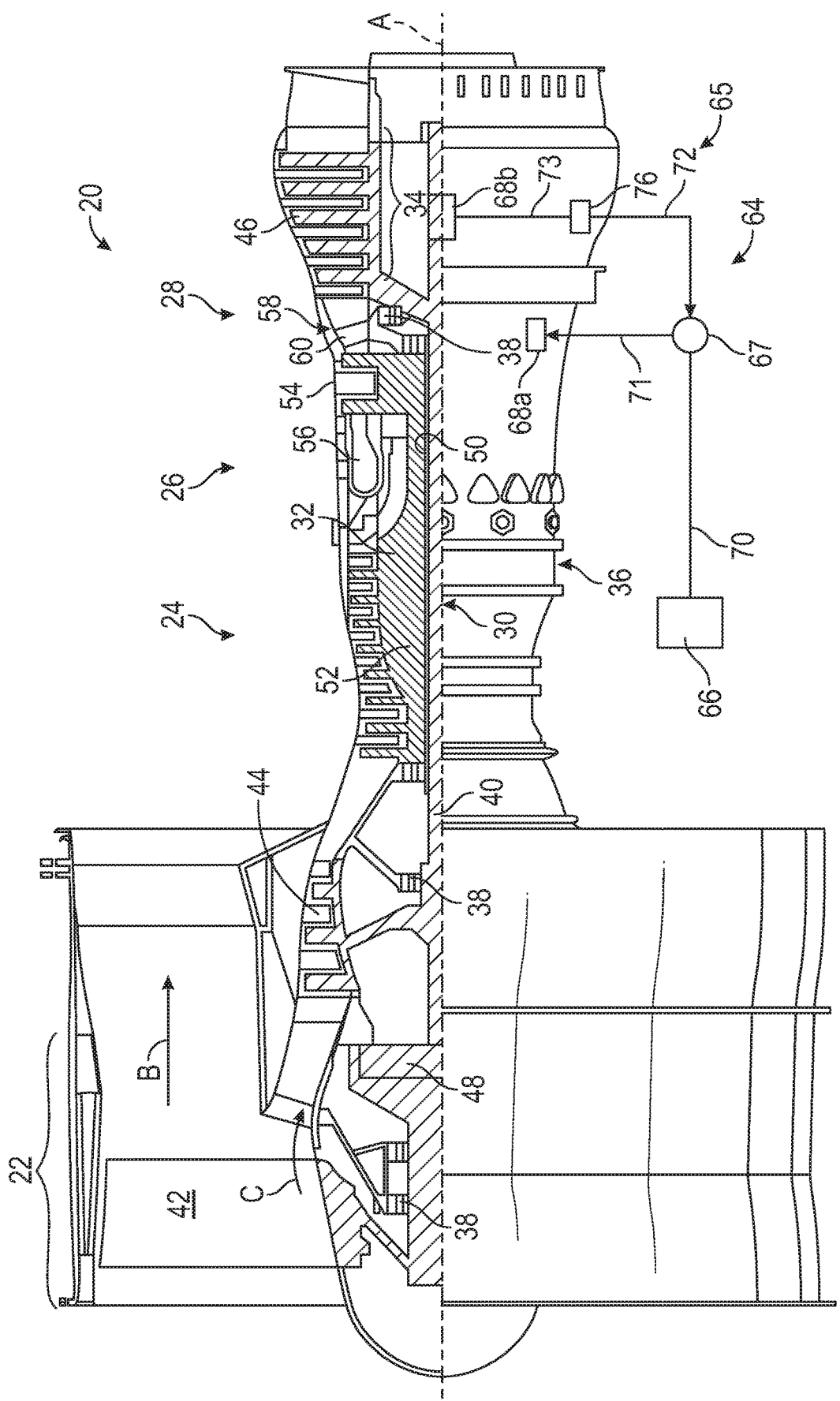
FIG. 1 is a cross-sectional view of a gas turbine engine as an example of a machine.

Various embodiments of the present disclosure are related to electromagnetic communication through and to components of a machine. FIG. 1 schematically illustrates a gas turbine engine 20 as one example of a machine as further described herein. The gas turbine engine 20 is depicted as a two-spool turbofan that generally incorporates a fan section 22, a compressor section 24, a combustor section 26 and a turbine section 28. Alternative engines may include an augmentor section (not shown) among other systems or features. The fan section 22 drives air along a bypass flow path B in a bypass duct to provide a majority of the thrust, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures or any other machine that requires sensors to operate with similar environmental challenges or constraints. Additionally, the concepts described herein may be applied to any machine or system comprised of control and/or health monitoring systems. Examples can include various moderate to high temperature environments, such as glass and metal forming systems, petroleum-oil-and-gas (POG) systems, ground-based turbine for energy generation, nuclear power systems, and transportation systems.

With continued reference to FIG. 1, the exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine engine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48. In direct drive configurations, the gear system 48 can be omitted.

The engine 20 in one example is a high-bypass geared aircraft engine. Low pressure turbine 46 pressure ratio is pressure measured prior to inlet of low pressure turbine 46 as related to the pressure at the outlet of the low pressure turbine 46 prior to an exhaust nozzle. A significant amount of thrust can be provided by the bypass flow B due to the high bypass ratio. The example low pressure turbine 46 can provide the driving power to rotate the fan section 22 and therefore the relationship between the number of turbine rotors 34 in the low pressure turbine 46 and the number of blades in the fan section 22 can establish increased power transfer efficiency.

The disclosed example gas turbine engine 20 includes a control and health monitoring system 64 (generally referred to as system 64) utilized to monitor component performance and function. The system 64 includes a network 65, which is an example of a guided electromagnetic transmission network. The network 65 includes a controller 66 operable to communicate with nodes 68a, 68b through electromagnetic signals. The nodes 68a, 68b can be distributed throughout the gas turbine engine 20 or other such machine. Node 68a is an example of an effector node that can drive one or more effectors/actuators of the gas turbine engine 20. Node 68b is an example of a sensor node that can interface with one or more sensors of the gas turbine engine 20. Nodes 68a, 68b can include processing support circuitry to transmit/receive electromagnetic signals between sensors or effectors and the controller 66. A coupler 67 can be configured as a splitter between a waveguide 70 coupled to the controller 66 and waveguides 71 and 72 configured to establish wireless communication with nodes 68a and 68b respectively. The coupler 67 can be a simple splitter or may include a repeater function to condition electromagnetic signals sent between the controller 66 and nodes 68a, 68b. In the example of FIG. 1, a radio frequency-based repeater 76 is interposed between the coupler 67 and node 68b, where waveguide 72 is a first waveguide coupled to the coupler 67 and radio frequency-based repeater 76, and waveguide 73 is a second waveguide coupled to the radio frequency-based repeater 76 and node 68b. Collectively, waveguides 70, 71, 72, 73 are configured to confine transmission of the electromagnetic signals between the controller 66 and one or more of the nodes 68a, 68b. The transmission media within waveguides 70-73 may include dielectric or gaseous material. In embodiments, the waveguides 70-73 can be hollow metal tubes. The disclosed system 64 may be utilized to control and/or monitor any component function or characteristic of a turbomachine, aircraft component operation, and/or other machines.

Prior control & diagnostic system architectures utilized in various applications include centralized system architecture in which the processing functions reside in an electronic control module. Redundancy to accommodate failures and continue system operation systems can be provided with dual channels with functionality replicated in both control channels. Actuator and sensor communication is accomplished through analog wiring for power, command, position feedback, sensor excitation and sensor signals. Cables and connections include shielding to minimize effects caused by electromagnetic interference (EMI). The use of analog wiring and the required connections limits application and capability of such systems due to the ability to locate wires, connectors and electronics in small and harsh environments that experience extremes in temperature, pressure, and/or vibration. Exemplary embodiments can use radio frequencies confined to waveguides 70-73 in a wireless architecture to provide both electromagnetic signals and power to the individual elements of the network 65.

The use of electromagnetic radiation in the form of radio waves (MHz to GHz) to communicate and power the sensors and effectors using a traditionally complex wired system enables substantial architectural simplification, especially as it pertains to size, weight, and power (SWaP). Embodiments of the invention enable extension of a network where reduced SNR would compromise network performance by trading off data rates for an expansion of the number of nodes and distribution lines; thereby enabling more nodes/sensors, with greater interconnectivity.

Figure 2:
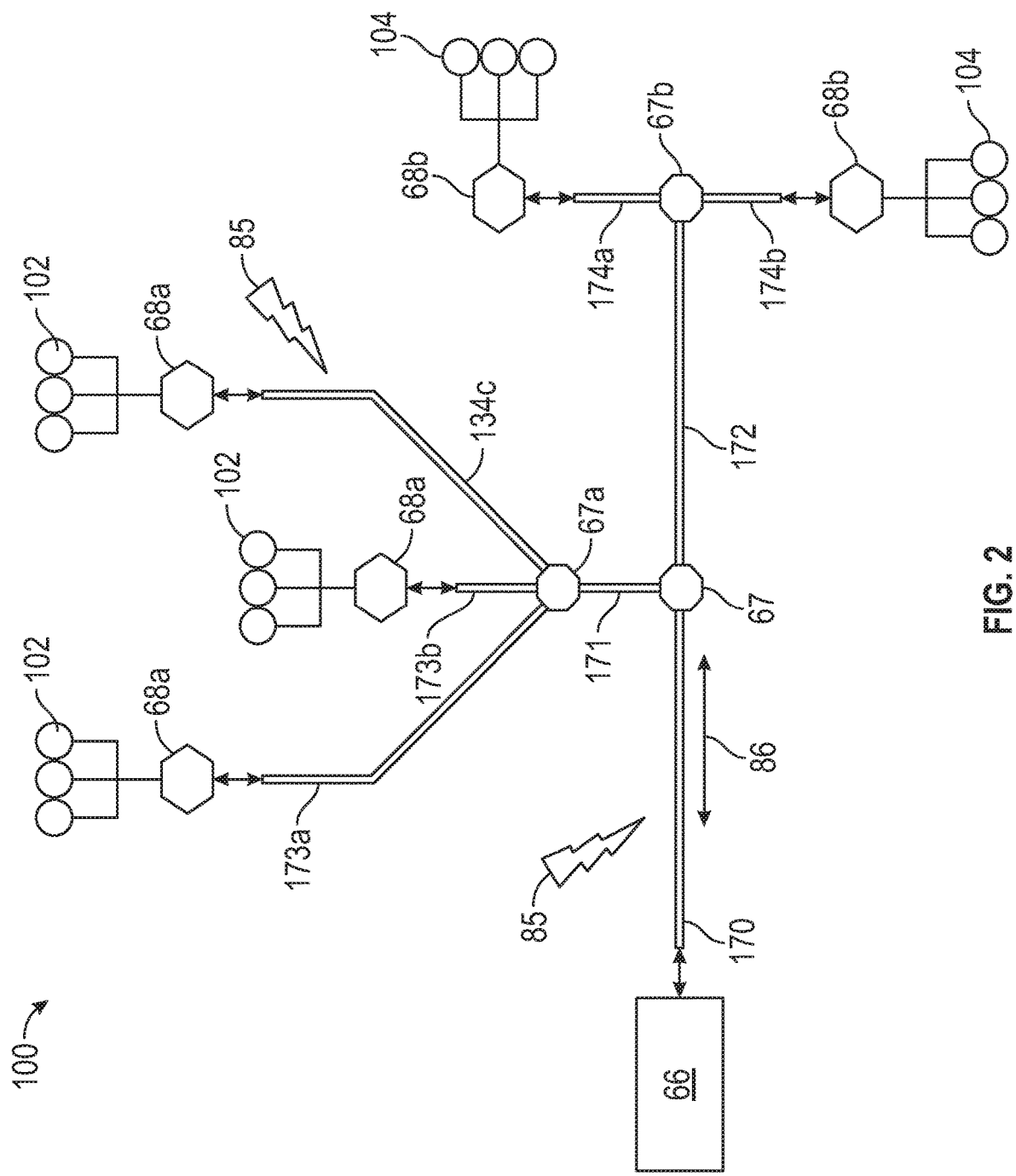
FIG. 2 is a schematic view of a guided electromagnetic transmission network in accordance with an embodiment of the disclosure.

Referring to FIG. 2, a guided electromagnetic transmission network 100 is depicted as an example expansion of the network 65 of FIG. 1. The guided electromagnetic transmission network 100 can include the controller 66 coupled to coupler 67 through waveguide 170. The coupler 67 is further coupled to coupler 67a through waveguide 171 and to coupler 67b through waveguide 172. Couper 67a is further coupled to three nodes 68a through waveguides 173a, 173b, 173c in parallel. Each of the nodes 68a can interface or be combined with multiple effectors 102. Coupler 67b is also coupled to two nodes 68b through waveguides 174a, 174b in parallel. Each of the nodes 68b can interface or be combined with multiple sensors 104. Although the example of FIG. 2 depicts connections to effectors 102 and sensors 104 isolated to different branches, it will be understood that effectors 102 and sensors 104 can be interspersed with each other and need not be isolated on dedicated branches of the guided electromagnetic transmission network 100. Couplers 67, 67a, 67b can be splitters and/or can incorporate instances of the radio frequency-based repeater 76 of FIG. 1. Further, one or more instances of the radio frequency-based repeater 76 can be installed at any of the waveguides 170, 171, 172, 173a-c, and/or 174a-b depending on the signal requirements of the guided electromagnetic transmission network 100.

Nodes 68a, 68b can be associated with particular engine components, actuators or any other machine part from which information and communication is performed for monitoring and/or control purposes. The nodes 68a, 68b may contain a single or multiple electronic circuits or sensors configured to communicate over the guided electromagnetic transmission network 100.

The controller 66 can send and receive power and data to and from the nodes 68a, 68b. The controller 66 may be located on equipment near other system components or located remotely as desired to meet application requirements.

A transmission path (TP) between the controller 66 and nodes 68a, 68b can be used to send and receive data routed through the controller 66 from a control module or other components. The TP may utilize electrical wire, optic fiber, waveguide or any other electromagnetic communication including radio frequency/microwave electromagnetic energy, visible or non-visible light. The interface between the controller 66 and nodes 68a, 68b can transmit power and signals.

The example nodes 68a, 68b may include radio-frequency identification (RFID) devices along with processing, memory and/or the interfaces to connect to conventional sensors or effectors, such as solenoids or electro-hydraulic servo valves. The waveguides 170, 171, 172, 173a-c, and/or 174a-b can be shielded paths that support electromagnetic communication, including, for instance, radio frequency, microwaves, magnetic or optic waveguide transmission. Shielding can be provided such that electromagnetic energy or light interference 85 with electromagnetic signals 86 (shown schematically as arrows) are mitigated in the guided electromagnetic transmission network 100. Moreover, the shielding provides that the electromagnetic signals 86 are less likely to propagate into the environment outside the guided electromagnetic transmission network 100 and enable unauthorized access to information. In some embodiments, confined electromagnetic radiation is in the range 1-100 GHz. Electromagnetic radiation can be more tightly confined around specific carrier frequencies, such as 3-4.5 GHz, 24 GHz, 60 GHz, or 76-77 GHz as examples in the microwave spectrum. A carrier frequency can transmit electric power, as well as communicate information, to multiple nodes 68a, 68b using various modulation and signaling techniques.

The nodes 68a with effectors 102 may include control devices, such as a solenoid, switch or other physical actuation devices. RFID, electromagnetic or optical devices implemented as the nodes 68b with sensors 104 can provide information indicative of a physical parameter, such as pressure, temperature, speed, proximity, vibration, identification, and/or other parameters used for identifying, monitoring or controlling component operation. Signals communicated in the guided electromagnetic transmission network 100 may employ techniques such as checksums, hash algorithms, error control algorithms and/or encryption to mitigate cyber security threats and interference.

The shielding in the guided electromagnetic transmission network 100 can be provided such that power and communication signals are shielded from outside interference, which may be caused by environmental electromagnetic or optic interference. Moreover, the shielding prevents intentional interference 85 with communication at each component. Intentional interference 85 may take the form of unauthorized data capture, data insertion, general disruption and/or any other action that degrades system communication. Environmental sources of interference 85 may originate from noise generated from proximate electrical systems in other components or machinery along with electrostatic and magnetic fields, and/or any broadcast signals from transmitters or receivers. Additionally, pure environmental phenomena, such as cosmic radio frequency radiation, lightning or other atmospheric effects, could interfere with local electromagnetic communications.

It should be appreciated that while the system 64 is explained by way of example with regard to a gas turbine engine 20, other machines and machine designs can be modified to incorporate built-in shielding for each monitored or controlled components to enable the use of a guided electromagnetic transmission network. For example, the system 64 can be incorporated in a variety of harsh environment machines, such as an elevator system, heating, ventilation, and air conditioning (HVAC) systems, manufacturing and processing equipment, a vehicle system, an environmental control system, and all the like. As a further example, the system 64 can be incorporated in an aerospace system, such as an aircraft, rotorcraft, spacecraft, satellite, or the like. The disclosed system 64 includes the network 65, 100 that enables consistent communication with electromagnetic devices, such as the example nodes 68a, 68b, and removes variables encountered with electromagnetic communications such as distance between transmitters and receiving devices, physical geometry in the field of transmission, control over transmission media such as air or fluids, control over air or fluid contamination through the use of filtering or isolation and knowledge of temperature and pressure.

The system 64 provides for a reduction in cable and interconnecting systems to reduce cost and increases reliability by reducing the number of physical interconnections. Reductions in cable and connecting systems further provides for a reduction in weight while enabling additional redundancy without significantly increasing cost. Moreover, additional sensors can be added without the need for additional wiring and connections that provide for increased system accuracy and response. Finally, the embodiments enable a "plug-n-play" approach to add a new node, potentially without a requalification of the entire system but only the new component; thereby greatly reducing qualification costs and time.

Figure 3:
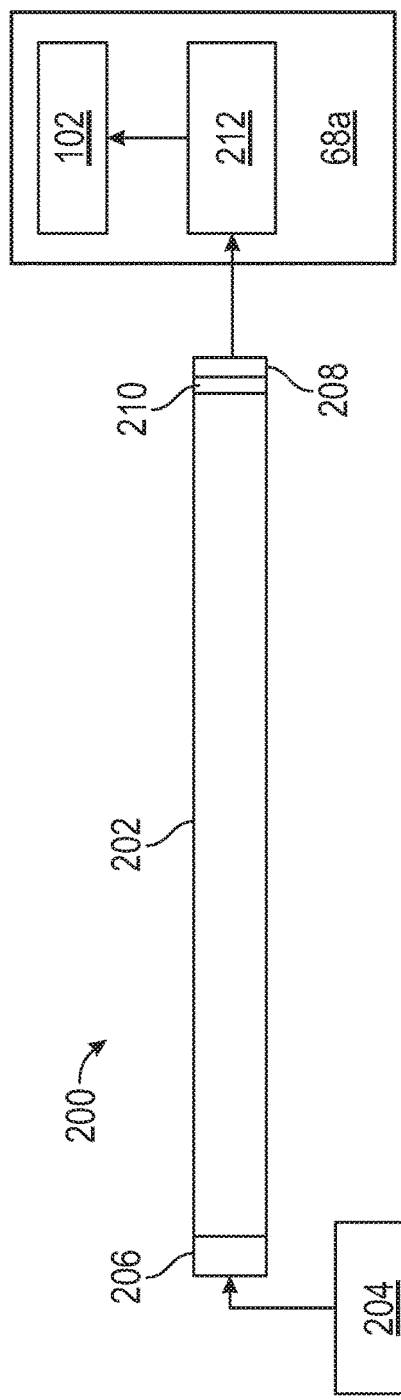
FIG. 3 is a schematic view of a communication path through a waveguide to an effector node in accordance with an embodiment of the disclosure.

FIG. 3 is a schematic view of a communication path 200 through a waveguide 202 from controller 66 to an effector node 68a. The communication path 200 can be part of network 65, 100 of FIGS. 1-2, or another guided electromagnetic transmission network. The waveguide 202 can be one or a plurality of waveguides configured to confine transmission of the electromagnetic signals. The communication path 200 also includes a radio frequency transceiver 204, a radio frequency antenna 206, a capacitively coupled membrane 208, and a dielectric disk 210. The radio frequency antenna 206 can be coupled to a first end of the waveguide 202, and the radio frequency transceiver 204 can be coupled between the controller 66 and the radio frequency antenna 206. The capacitively coupled membrane 208 at a second end of the waveguide 202 can be configured to establish communication between the waveguide 202 and the effector node 68a. The dielectric disk 210 in the waveguide 202 can be proximate to the capacitively coupled membrane 208, where the dielectric disk 210 is configured to generate a plurality of acoustic pressure waves to mechanically vibrate the capacitively coupled membrane 208 responsive to the pulse train broadcast through the waveguide 202. The controller 66 can transmit control signals (e.g., effector commands) to modulate the pulse train using, for instance, pulse position, pulse width, and/or pulse amplitude modulation. In some embodiments, the pulse train can be a periodic pulse train.

In exemplary embodiments, the pulse train can include microwave pulses. The waveguide 202 can be hollow and metallic, where the pulses generate acoustic pressure waves inside the dielectric disk 210, which may be electromagnetically lossy. The dielectric disk 210 can be formed of an engineered material of a desired dielectric constant and/or other desired parameters. Excitation by pulses can result in thermoelastic expansion of the dielectric disk 210, for instance, due to microwave acoustic effects. Variable acoustic pressure through the dielectric disk 210 can be proportional to a control signal causing mechanical vibrations on the capacitively coupled membrane 208.

The effector node 68a can include a receiver and driver 212 configured to convert vibration of the capacitively coupled membrane 208 to an electrical signal to control an effector 102. Electrical power can be provided to the receiver and driver 212 and effector 102 using a local power source or power extracted from electromagnetic signals in the waveguide 202. For example, signals broadcast in the waveguide 202 can include frequencies in different transmission frequency bands to provide power at a different frequency than control signals. Multiple types of signals can be transmitted through the waveguide 202 including control and position feedback signals. Although a single instance of waveguide 202 and effector node 68a are depicted in FIG. 3, there can be multiple branches of waveguide 202 to support multiple effectors 102 in various locations. Branching of the waveguide 202 can be achieved using couplers 67, 67a, 67b of FIG. 2, for example.

Figure 4:
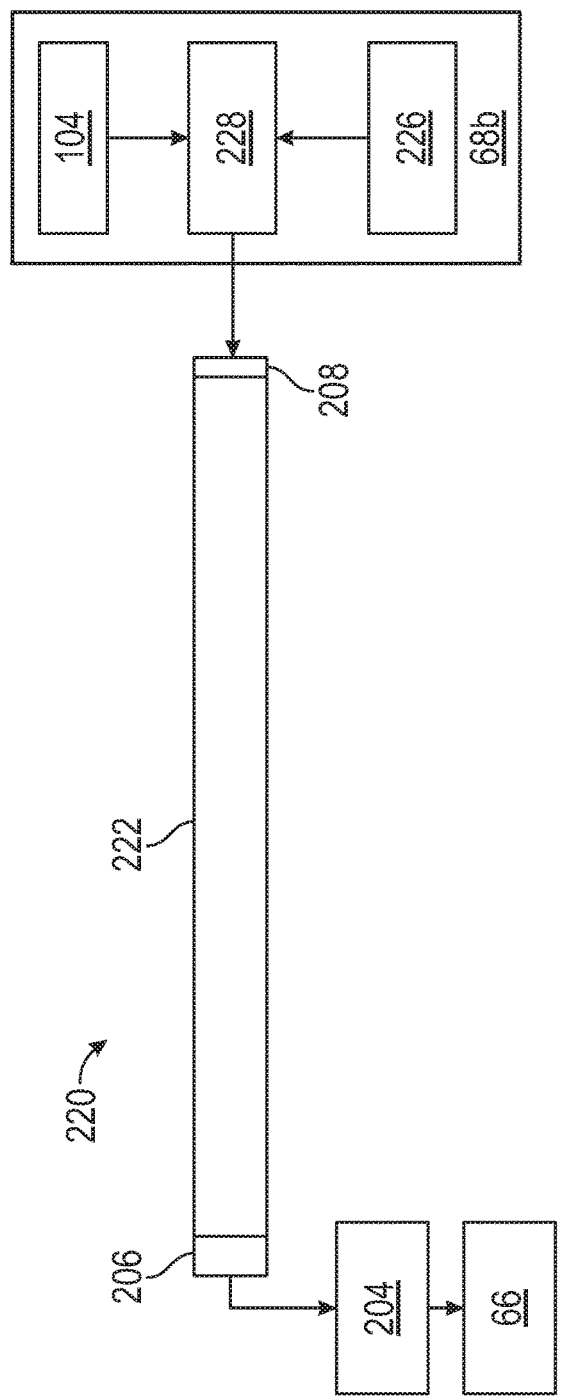
FIG. 4 is a schematic view of a communication path through a waveguide to a sensor node in accordance with an embodiment of the disclosure.

FIG. 4 is a schematic view of a communication path 220 through waveguide 222 from a sensor node 68b to controller 66. The communication path 220 can be part of network 65, 100 of FIGS. 1-2, or another guided electromagnetic transmission network. The waveguide 222 can be one or a plurality of waveguides configured to confine transmission of the electromagnetic signals. The communication path 220 can also include radio frequency transceiver 204, radio frequency antenna 206, and capacitively coupled membrane 208. The radio frequency transceiver 204 can be a radar-type transceiver configured to detect displacement of the capacitively coupled membrane 208 by measuring a distance and changes in distance responsive to vibrations of the capacitively coupled membrane 208. The radio frequency antenna 206 can be coupled to a first end of the waveguide 222, and the radio frequency transceiver 204 can be coupled between the controller 66 and the radio frequency antenna 206. The capacitively coupled membrane 208 at a second end of the waveguide 222 can be configured to establish communication between the waveguide 222 and the sensor node 68b.

The sensor node 68b can include an oscillator 226 and a modulator 228 configured to vibrate the capacitively coupled membrane 208 based on a sensor 104 response. The radio frequency transceiver 204 can be configured to detect vibration of the capacitively coupled membrane 208. The modulator 228 can produce amplitude modulation at the capacitively coupled membrane 208, where input from the sensor 104 is modulated by the modulator 228 with a carrier frequency of the oscillator 226. A radio frequency distance signal can be received at the radio frequency transceiver 204 as a proportional signal generated by the sensor 104. The oscillator 226 and modulator 228 can be made of high-temperature capable materials using, for example passive elements and/or semiconductor diodes to survive high temperatures, such as an engine core. Materials for high-temperature application can include silicon carbide, gallium nitride, aluminum nitride, aluminum scrandium nitride, and other such materials. Components of the sensor node 68b can be locally powered or powered by energy extracted from electromagnetic signals in the waveguide 222. For example, the radio frequency transceiver 204 can broadcast power and control signals and receive encoded sensor signals at different frequencies. The use of different frequencies for multiple sensors 104 can enable parallel data acquisition. Frequencies can be set by different oscillators 226.

Figure 5:
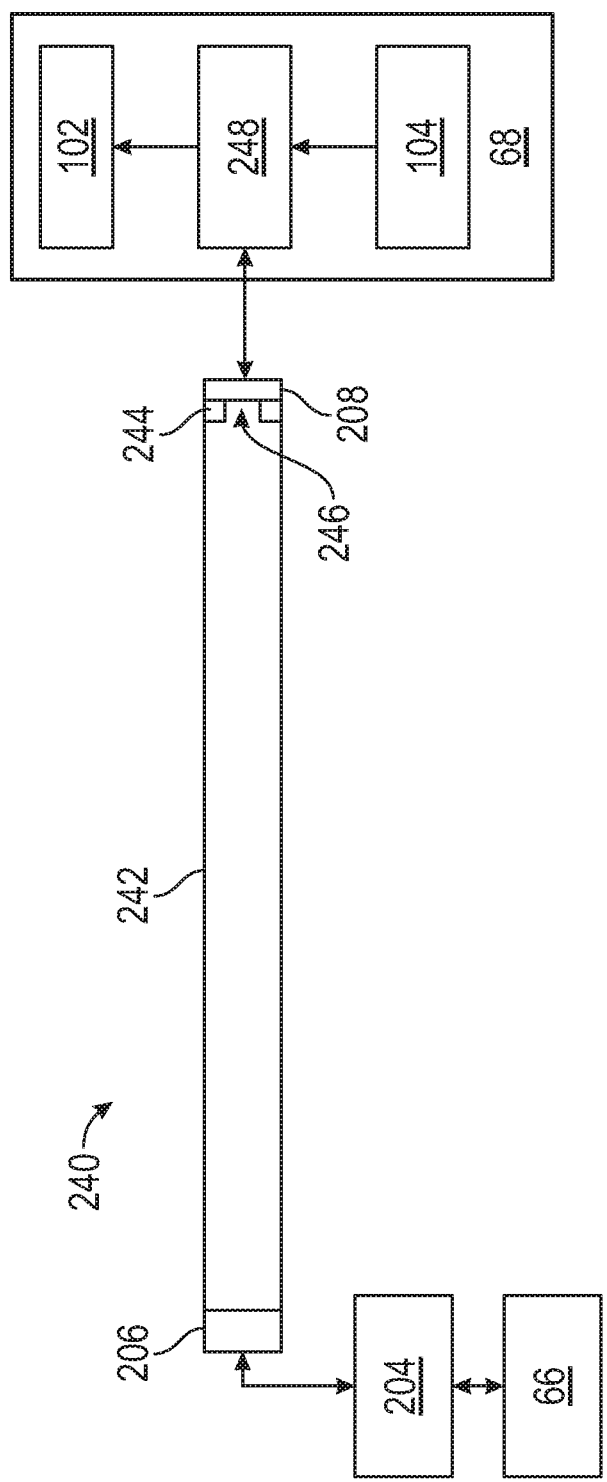
FIG. 5 is a schematic view of a communication path through a waveguide to an effector and sensor node in accordance with an embodiment of the disclosure.

FIG. 5 is a schematic view of a communication path 240 through a waveguide 242 between controller 66 and an effector and sensor node 68. The communication path 240 can be part of network 65, 100 of FIGS. 1-2, or another guided electromagnetic transmission network. The waveguide 242 can be one or a plurality of waveguides configured to confine transmission of the electromagnetic signals. The communication path 240 can also include radio frequency transceiver 204, radio frequency antenna 206, and capacitively coupled membrane 208. The radio frequency antenna 206 can be coupled to a first end of the waveguide 242, and the radio frequency transceiver 204 can be coupled between the controller 66 and the radio frequency antenna 206. The capacitively coupled membrane 208 at a second end of the waveguide 242 can be configured to establish communication between the waveguide 242 and the sensor node 68. The waveguide 242 can include a dielectric ring 244 with an aperture 246 proximate to the capacitively coupled membrane 208, where the dielectric ring 244 is configured to generate a plurality of acoustic pressure waves to mechanically vibrate the capacitively coupled membrane 208 responsive to a pulse train broadcast through the waveguide 242. The capacitively coupled membrane 208 can be coupled to a transceiver 248 configured to communicate with at least one effector 102 and at least one sensor 104. The aperture 246 of the dielectric ring 244 can provide a direct path between the capacitively coupled membrane 208 and the radio frequency antenna 206 for transmitting sensor data of the sensor 104 back to the radio frequency transceiver 204, while dielectric material of the dielectric ring 244 can enhance transmission of commands for the effector 102 from the radio frequency transceiver 204 to the transceiver 248. Commanding the effector 102 and data collection from the sensor 104 can be performed as previously described in the configurations of FIGS. 3 and 4.

Figure 6:
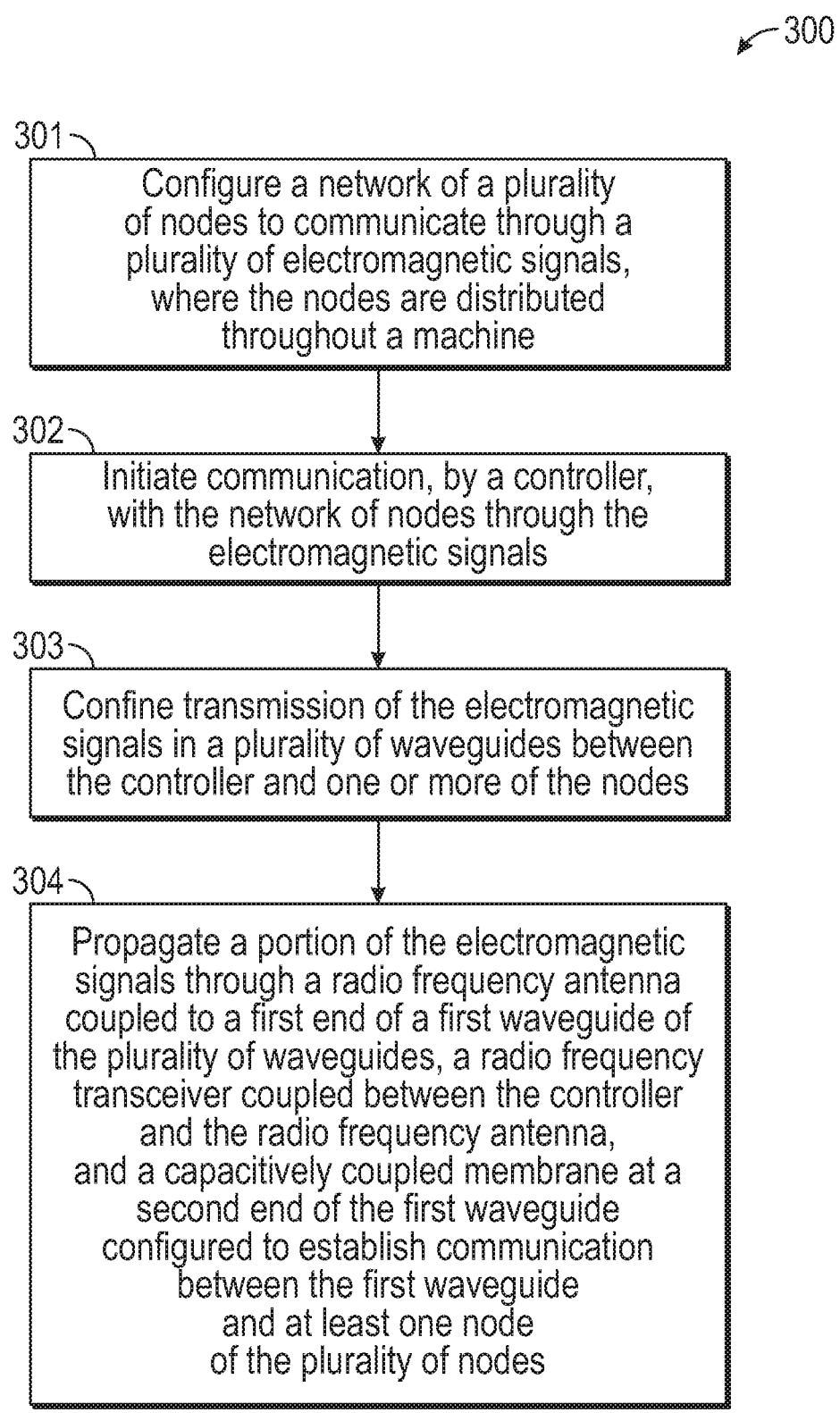
FIG. 6 is a flow chart illustrating a method in accordance with an embodiment of the disclosure.

FIG. 6 is a flow chart illustrating a method 300 of establishing electromagnetic communication through a machine, such as the gas turbine engine 20 of FIG. 1 in accordance with an embodiment. The method 300 of FIG. 6 is described in reference to FIGS. 1-5 and may be performed with an alternate order and include additional steps. For purposes of explanation, the method 300 is primarily described in reference to FIG. 1 but can also be implemented on the guided electromagnetic transmission network 100 of FIG. 2 and other network variations and a variety of machines. The machine may operate in or produce a high-temperature environment (e.g., >150 degrees C.) beyond the normal range of microelectronics, which is typically less than 100 degrees C. The local temperature at different sections of the machine can vary substantially, such as upstream from combustion, at a fuel combustion location, and downstream from combustion.

At block 301, a network 65 of a plurality of nodes 68a, 68b can be configured to communicate through a plurality of electromagnetic signals, where the nodes 68a, 68b are distributed throughout a machine, such as the gas turbine engine 20. Multiple nodes 68a, 68b can be used in a complete system 64 to take advantage of architecture scalability. Each of the nodes 68a, 68b can be associated with at least one effector 102 or senor 104 of the gas turbine engine 20. For example, one or more of the nodes 68a, 68b can be located at least one of a fan section 22, a compressor section 24, a combustor section 26, and/or a turbine section 28 of the gas turbine engine 20.

At block 302, a controller 66 can initiate communication with the network 65 of nodes 68a, 68b through the electromagnetic signals, such as electromagnetic signals 86. Specific tones can be used to target desired end-points in the network 65.

At block 303, transmission of the electromagnetic signals is confined in a plurality of waveguides 70-73, 202, 222, 242 between the controller 66 and one or more of the nodes 68a, 68b. The waveguides 70-73, 202, 222, 242 can include a waveguide medium, such as a gas or dielectric. The waveguide medium can be a fluid used by the machine, such as fuel, oil or other fluid in the gas turbine engine 20. Alternatively, the waveguide medium can be an engineered material to support electromagnetic communication. Further, the waveguide medium can be air.

At block 304, a portion of the electromagnetic signals can be propagated through a radio frequency antenna 206 coupled to a first end of a first waveguide 202, 222, 242 of the plurality of waveguides 70-73, 202, 222, 242. A radio frequency transceiver 204 is coupled between the controller 66 and the radio frequency antenna 206. A capacitively coupled membrane 208 at a second end of the first waveguide 202, 222, 242 can be configured to establish communication between the first waveguide 202, 222, 242 and at least one node 68, 68a, 68b of the plurality of nodes 68, 68a, 68b.

A pulse train can be output from the radio frequency transceiver 204 to the radio frequency antenna 206 to broadcast within the first waveguide 202, 222, 242 responsive to the controller 66. As previously described with respect to FIG. 3, a plurality of acoustic pressure waves can be generated to mechanically vibrate the capacitively coupled membrane 208 responsive to the pulse train broadcast through the first waveguide 202 and the dielectric disk 210. With respect to FIG. 4, the capacitively coupled membrane 208 can vibrate based on a sensor response through the oscillator 226 and modulator 228, and vibration of the capacitively coupled membrane 208 can be detected by the radio frequency transceiver 204. With respect to FIG. 5, a plurality of acoustic pressure waves can be generated by the dielectric ring 244 to mechanically vibrate the capacitively coupled membrane 208 responsive to the pulse train broadcast through the first waveguide 242.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system of a machine, the system comprising:
   a network of nodes distributed throughout the machine;
   a controller operable to communicate with the network of nodes through one or more electromagnetic signals;
   a plurality of waveguides configured to guide transmission of the one or more electromagnetic signals;
   a radio frequency antenna coupled to a first waveguide of the plurality of waveguides;
   a radio frequency transceiver coupled between the controller and the radio frequency antenna; and
   a membrane configured to support communication between the first waveguide and at least one node of the plurality of nodes.

2. The system of claim 1, wherein the first waveguide comprises a hollow metallic waveguide.

3. The system of claim 1, wherein the radio frequency transceiver is configured to output a pulse train to the radio frequency antenna to broadcast within the first waveguide responsive to the controller.

4. The system of claim 3, further comprising a dielectric disk in the first waveguide proximate to the membrane, wherein the dielectric disk is configured to generate a plurality of acoustic pressure waves to mechanically vibrate the membrane responsive to the pulse train broadcast through the first waveguide, and the at least one node comprises an effector node.

5. The system of claim 1, wherein the at least one node comprises an oscillator and a modulator configured to vibrate the membrane based on a sensor response, and the radio frequency transceiver is configured to detect vibration of the membrane.

6. The system of claim 5, wherein the radio frequency transceiver is configured to output a pulse train to the radio frequency antenna to broadcast within the first waveguide responsive to the controller.

7. The system of claim 6, further comprising a dielectric ring in the first waveguide proximate to the membrane, wherein the dielectric ring is configured to generate a plurality of acoustic pressure waves to mechanically vibrate the membrane responsive to the pulse train broadcast through the first waveguide, and the at least one node comprises an effector and sensor node.

8. A system for a gas turbine engine, the system comprising:
   a network of a plurality of nodes distributed throughout the gas turbine engine, each of the nodes associated with at least one sensor and/or effector of the gas turbine engine and operable to communicate through one or more electromagnetic signals;
   a controller of the gas turbine engine operable to communicate with the network of nodes through the one or more electromagnetic signals;
   a plurality of waveguides configured to guide transmission of the one or more electromagnetic signals between the controller and one or more of the nodes;
   a radio frequency antenna coupled to a first waveguide of the plurality of waveguides;
   a radio frequency transceiver coupled between the controller and the radio frequency antenna; and a membrane configured to support communication between the first waveguide and at least one node of the plurality of nodes.

9. The system of claim 8, wherein one or more of the nodes are located at least one of a fan section, a compressor section, a combustor section and a turbine section of the gas turbine engine, and the first waveguide comprises a hollow metallic waveguide.

10. The system of claim 8, wherein the radio frequency transceiver is configured to output a pulse train to the radio frequency antenna to broadcast within the first waveguide responsive to the controller.

11. The system of claim 10, further comprising a dielectric disk in the first waveguide proximate to the membrane, wherein the dielectric disk is configured to generate a plurality of acoustic pressure waves to mechanically vibrate the membrane responsive to the pulse train broadcast through the first waveguide, and the at least one node comprises an effector node.

12. The system of claim 8, wherein the at least one node comprises an oscillator and a modulator configured to vibrate the membrane based on a sensor response, and the radio frequency transceiver is configured to detect vibration of the membrane.

13. The system of claim 12, wherein the radio frequency transceiver is configured to output a pulse train to the radio frequency antenna to broadcast within the first waveguide responsive to the controller, and further comprising a dielectric ring in the first waveguide proximate to the membrane, wherein the dielectric ring is configured to generate a plurality of acoustic pressure waves to mechanically vibrate the membrane responsive to the pulse train broadcast through the first waveguide, and the at least one node comprises an effector and sensor node.

14. A method of establishing electromagnetic communication through a machine, the method comprising:
configuring a network of a plurality of nodes to communicate through one or more electromagnetic signals, wherein the nodes are distributed throughout the machine;
initiating communication between a controller and the network of nodes through the one or more electromagnetic signals;
guiding transmission of the one or more electromagnetic signals in a plurality of waveguides between the controller and one or more of the nodes;
propagating a portion of the one or more electromagnetic signals through a radio frequency antenna coupled to a first waveguide of the plurality of waveguides, a radio frequency transceiver coupled between the controller and the radio frequency antenna, and a membrane configured to support communication between the first waveguide and at least one node of the plurality of nodes.

15. The method of claim 14, wherein the first waveguide comprises a hollow metallic waveguide.

16. The method of claim 14, further comprising outputting a pulse train from the radio frequency transceiver to the radio frequency antenna to broadcast within the first waveguide responsive to the controller.

17. The method of claim 16, wherein a dielectric disk in the first waveguide is proximate to the membrane, and further comprising generating a plurality of acoustic pressure waves to mechanically vibrate the membrane responsive to the pulse train broadcast through the first waveguide and the dielectric disk, and the at least one node comprises an effector node.

18. The method of claim 14, wherein the at least one node comprises an oscillator and a modulator, and further comprising:
vibrating the membrane based on a sensor response modulated with a carrier frequency of the oscillator by the modulator; and
detecting vibration of the membrane by the radio frequency transceiver.

19. The method of claim 18, further comprising outputting a pulse train by the radio frequency transceiver to the radio frequency antenna to broadcast within the first waveguide responsive to the controller.

20. The method of claim 19, wherein a dielectric ring in the first waveguide is proximate to the membrane, and further comprising generating a plurality of acoustic pressure waves by the dielectric ring to mechanically vibrate the membrane responsive to the pulse train broadcast through the first waveguide, and the at least one node comprises an effector and sensor node.

* * * * *